US012608026B2

(12) United States Patent (10) Patent No.: US 12,608,026 B2
Ahn (45) Date of Patent: Apr. 21, 2026

(54) METHOD AND APPARATUS FOR ANOMALY DETECTION FOR INDIVIDUAL VEHICLES IN SWARM SYSTEM

(71) Applicant: KOREA AEROSPACE RESEARCH INSTITUTE, Daejeon (KR)

(72) Inventor: Hyo Jung Ahn, Daejeon (KR)

(73) Assignee: Korea Aerospace Research Institute, Daejeon (KR)

( * ) Notice: Subject to any disclaimer, the term of this patent is extended or adjusted under 35 U.S.C. 154(b) by 42 days.

(21) Appl. No.: 18/946,598

(22) Filed: Nov. 13, 2024

(65) Prior Publication Data

US 2025/0165013 A1 May 22, 2025

(30) Foreign Application Priority Data

Nov. 22, 2023 (KR) ........................ 10-2023-0163195

(51) Int. Cl.
*G05D 1/86* (2024.01)
*G05D 101/15* (2024.01)
(Continued)

(52) U.S. Cl.
CPC ........... *G05D 1/86* (2024.01); *G05D 2101/15* (2024.01); *G05D 2109/20* (2024.01); *G05D 2111/52* (2024.01)

(58) Field of Classification Search
CPC .. G05D 1/86; G05D 2109/20; G05D 2111/52; G05D 2101/15; B64U 2201/00;
(Continued)

(56) References Cited

U.S. PATENT DOCUMENTS 12,033,445 B1 * 7/2024 Mishra ................. G07C 5/0816
12,306,000 B2 * 5/2025 Con .................. G08G 1/096716
(Continued)

FOREIGN PATENT DOCUMENTS

KR        10-2170632 B1    10/2020
WO    WO-2018004681 A1 *    1/2018    ............ H04W 12/06
WO    WO-2021046026 A1 *    3/2021    ............ G08G 5/727

OTHER PUBLICATIONS

Diego et al., "On the Analysis of a Swarm Intelligence Based Coordination Model for Multiple Unmanned Aerial Vehicles," 2012, Publisher: IEEE.*
(Continued)

*Primary Examiner* — Tuan C To
(74) *Attorney, Agent, or Firm* — Rabin & Berdo, P.C.

(57) ABSTRACT
A method for detecting anomalies in a swarm system comprises: collecting first movement data from multiple vehicles moving as a swarm in a first scenario; generating first training data based on positioning data and second training data based on multi-channel inertial sensor data from the first movement data; training a first learning model using the first training data and multiple second learning models using the second training data for each vehicle; receiving real-time second movement data from vehicles moving as a swarm in a second scenario; generating first input data based on positioning data from the second movement data; inputting the first input data into the first learning model to detect abnormal vehicles in real-time; generating second input data for abnormal vehicles based on inertial sensor data from the second movement data; and inputting the second input data into the corresponding second learning model to identify abnormal channels in the inertial measurement unit of abnormal vehicles.

13 Claims, 14 Drawing Sheets

(51) Int. Cl.
G05D 109/20 (2024.01)
G05D 111/50 (2024.01)

(58) Field of Classification Search
CPC ........ B64U 20/00; G01C 21/16; G06N 20/00;
G06N 3/04; G06T 2207/20081; G06F
11/30; B64C 39/024; G07C 5/00
USPC .......................................................... 701/3
See application file for complete search history.

(56) References Cited

U.S. PATENT DOCUMENTS

| | | | |
|---|---|---|---|
| 2014/0231590 A1 | 8/2014 | Trowbridge et al. | |
| 2014/0374535 A1 * | 12/2014 | Wong .................... | F21V 21/15 |
| | | | 244/17.23 |
| 2015/0338855 A1 * | 11/2015 | Stark .................... | B64D 47/02 |
| | | | 701/3 |

OTHER PUBLICATIONS

M. Jamal et al., "AWG-Detector: A machine learning tool for the accurate detection of Anomalies due to Wind Gusts (AWG) in the adaptive Altitude control unit of an Aerosonde unmanned Aerial Vehicle," 2010, Publisher: IEEE.*
Korean Office Action dated Mar. 21, 2024, in the counterpart Korean patent application No. 10-2023-0163195.

* cited by examiner

METHOD AND APPARATUS FOR ANOMALY DETECTION FOR INDIVIDUAL VEHICLES IN SWARM SYSTEM

CROSS-REFERENCE TO RELATED APPLICATION

This application claims priority to Korean Patent Application No. 10-2023-0163195, filed in the Korean Intellectual Property Office on Nov. 22, 2023, the entire contents of which are hereby incorporated by reference.

BACKGROUND

Field

The present disclosure relates to a method and apparatus for detecting anomalies in individual vehicles within a swarm system.

Description of Related Art

Recently, vehicles such as drones have been utilized in various fields, including reconnaissance, surveillance, rescue, logistics and transportation, environmental monitoring, agriculture, and fire safety missions. In some operations, synergy between multiple vehicles is necessary, and thus, the use of swarm systems, where multiple vehicles perform missions together while moving in a coordinated manner, has been increasing.

Although drone technology offers many advantages, safety remains a critical issue in drone operations and maintenance. If debris falls from a malfunctioning drone or if a sudden crash occurs before safety devices can be activated, it can pose significant risks. Therefore, to mitigate such risks and enable quick responses in the event of a malfunction, it is necessary to develop technology capable of monitoring the operational status of drones in real-time.

Conventionally, the only way to detect an anomaly in one of the vehicles in a swarm system was through direct visual inspection. While there are methods for detecting anomalies using signals from each vehicle, it becomes nearly impossible to monitor these in real-time as the number of vehicles increases.

SUMMARY

In order to solve one or more problems (e.g., the problems described above and/or other problems not explicitly described herein), the present disclosure provides a method and computer program for detecting anomalies and identifying abnormal channels in real-time among multiple vehicles constituting a swarm system.

According to some aspects of the disclosure, a method for detecting anomalies in a swarm system may include collecting a plurality of first movement data from multiple vehicles that moved as a swarm according to a first scenario, wherein the plurality of first movement data includes positioning data and multi-channel inertial sensor data; generating a plurality of first training data corresponding to each of the vehicles based on the positioning data included in the plurality of first movement data, and training a first learning model using the plurality of first training data; generating a plurality of second training data corresponding to each of the vehicles based on the multi-channel inertial sensor data included in the plurality of first movement data, and training a plurality of second learning models corresponding to each of the vehicles using the second training data generated for each of the vehicles; receiving in real time a plurality of second movement data from the vehicles moving as a swarm according to a second scenario, wherein the plurality of second movement data includes positioning data and multichannel inertial sensor data; generating a plurality of first input data corresponding to each of the vehicles based on the positioning data included in the plurality of second movement data, and inputting the plurality of first input data into the first learning model to detect in real time any abnormal vehicle estimated to be in an abnormal state among the vehicles; and generating a second input data corresponding to the abnormal vehicle based on the multi-channel inertial sensor data included in the second movement data corresponding to the abnormal vehicle, and inputting the second input data into the second learning model corresponding to the abnormal vehicle to identify the abnormal channel among the multiple channels of the inertial measurement unit of the abnormal vehicle.

The second learning models may be trained using a supervised learning technique, a semi-supervised learning technique, or an unsupervised learning technique with the second training data based on a labeling status of the second training data.

Only a portion of the second training data is labeled as a normal state, and the second learning model may be trained using a semi-supervised learning technique.

The second learning models may be the learning models are Generative models.

The second learning models may be any one of Variational Autoencoder (VAE), AnoGAN, GANomaly, or Skip-GANomaly.

The second learning models may generate multi-channel reconstructed data for each of the multi-channel inertial sensor data included in the second input data, identify the abnormal state of the abnormal vehicle based on reconstruction errors between each of the multi-channel inertial sensor data and each of the multi-channel reconstructed data, and identify the abnormal channel based on anomaly probability values calculated for each of the multiple channels.

According to other aspects of the disclosure, a method for detecting anomalies in a swarm system may include collecting a plurality of first movement data from multiple vehicles that moved as a swarm according to a first scenario, wherein the plurality of first movement data includes multi-channel inertial sensor data, generating a plurality of training data corresponding to each of the vehicles based on the plurality of first movement data, and training a plurality of learning models corresponding to each of the vehicles using the training data generated for each vehicle, collecting in real time a plurality of second movement data from the vehicles moving as a swarm according to a second scenario, wherein the plurality of second movement data includes multichannel inertial sensor data, generating a plurality of input data corresponding to each of the vehicles based on the plurality of second movement data, and inputting the plurality of input data into the corresponding learning models to detect anomalies in each of the vehicles, and identifying the abnormal channel among the multiple channels of the inertial measurement unit of the vehicle detected to be in an abnormal state.

The learning models may be trained using a supervised learning technique, a semi-supervised learning technique, or an unsupervised learning technique with the training data based on a labeling status of the training data.

Only a portion of the training data may be labeled as a normal state, and the learning models may be trained using a semi-supervised learning technique with the training data.

The learning models may be the learning models are Generative models.

The learning models may be any one of a VAE, AnoGAN, GANomaly, or Skip-GANomaly.

The learning models may generate reconstructed data for each of the multi-channel inertial sensor data included in the second movement data, identify the abnormal state of the abnormal vehicle based on the reconstruction errors between the inertial sensor data and the reconstructed data for each channel, and identify the abnormal channel based on the anomaly probability values calculated for each channel.

An embodiment of the present disclosure for solving the aforementioned technical problem comprises a non-transitory computer-readable recording medium storing a program for detecting anomalies in the swarm system as described above.

According to some aspects of the disclosure, there is an advantage in that real-time detection of anomalies and identification of abnormal channels among multiple vehicles constituting a swarm system can be performed. In particular, by detecting abnormal channel signals among the multi-channel signals from the inertial measurement unit mounted on the abnormal vehicle, the cause of the anomaly can be identified.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawing, in which:

FIG. 5 is a diagram illustrating the method for training the first learning model according to one embodiment of the present invention;

In FIG. 9, there is a case where the reconstruction error spikes and then returns to normal, which corresponds to cases caused by temporary communication errors or control logic issues;

In FIG. 10, there is a case where the reconstruction error spikes and the device fails to operate, which corresponds to a severe malfunction that causes a drone to crash;

4

Figure 11:
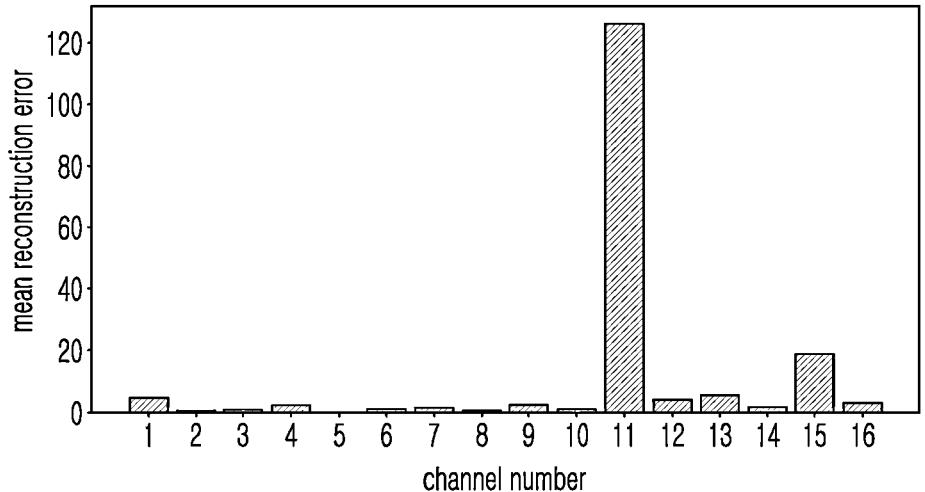
FIG. 11 is a graph showing the average reconstruction error for each channel for a drone in which an abnormal condition was detected during a test flight.
Figure 12:
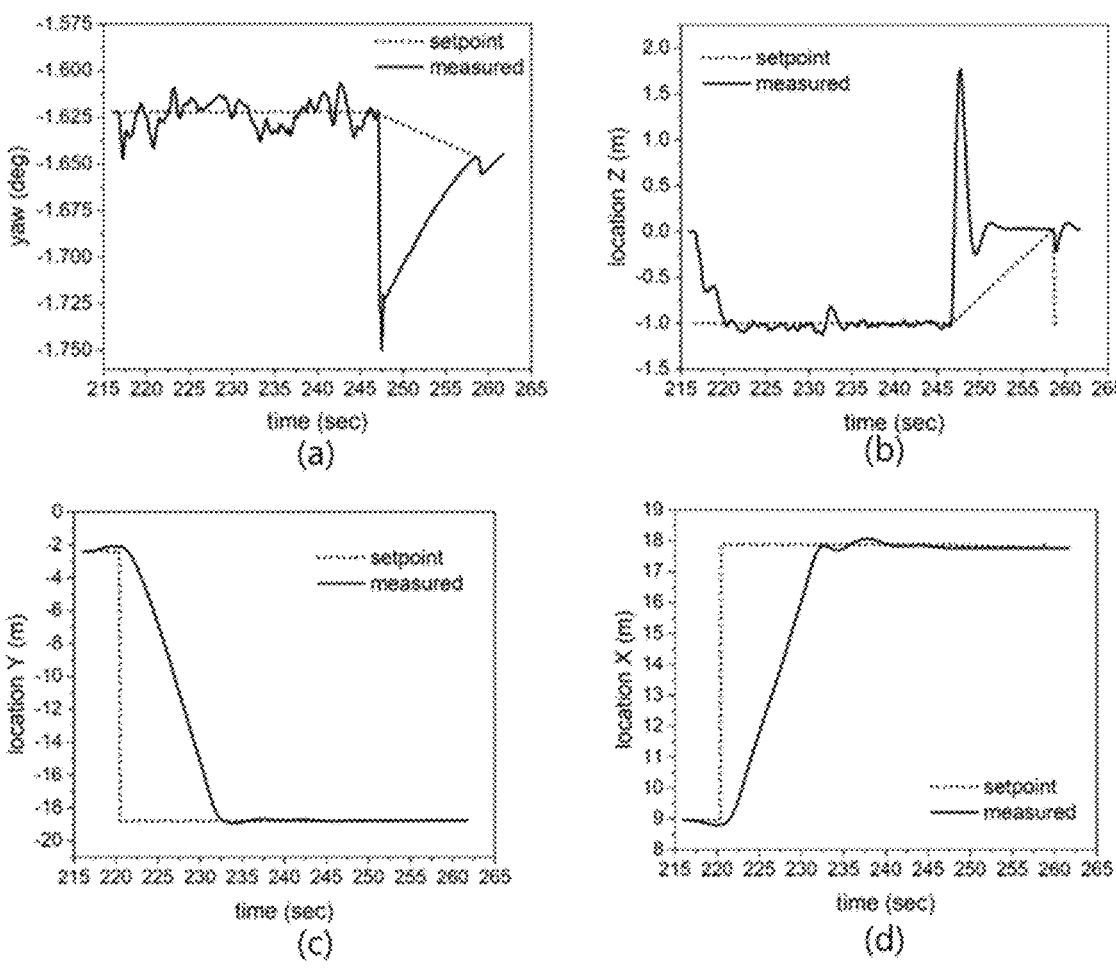

FIG. 12 is a graph showing the position data confirmed through flight log analysis in the case of FIG. 11.

DETAILED DESCRIPTION

Hereinafter, certain embodiments will be described in detail with reference to the accompanying drawings to help those with ordinary knowledge in the art easily achieve the present disclosure.

The terms are used herein for the purpose of describing the embodiments and not intended to limit the present disclosure. In the description, a singular expression also includes a plural expression unless specifically stated otherwise in the context. The terms "comprises" and/or "comprising" as used herein do not foreclose the presence or addition of one or more components other than the specified component. Throughout the description, the same reference numerals refer to the same components, and "and/or" includes each and combinations of one or more of the specified components. The terms "first", "second", etc. are used to describe various components, but it goes without saying that these components are not limited by these terms. These terms are only used to distinguish one component from another.

Therefore, it goes without saying that a first component mentioned below may be a second component within the technical idea of the present disclosure.

A "computing device" as used herein includes all various devices capable of performing computations and providing results to a user. For example, a computing devices may include desktop PCs, notebook computers, and server computers, as well as smart phones, tablet PCs, cellular phones, PCS phones (Personal Communication Service phones), synchronous and asynchronous IMT-2000 (International Mobile Telecommunication-2000) mobile terminals, palm personal computers (Palm PCs), and personal digital assistants (PDAs).

Figure 1:
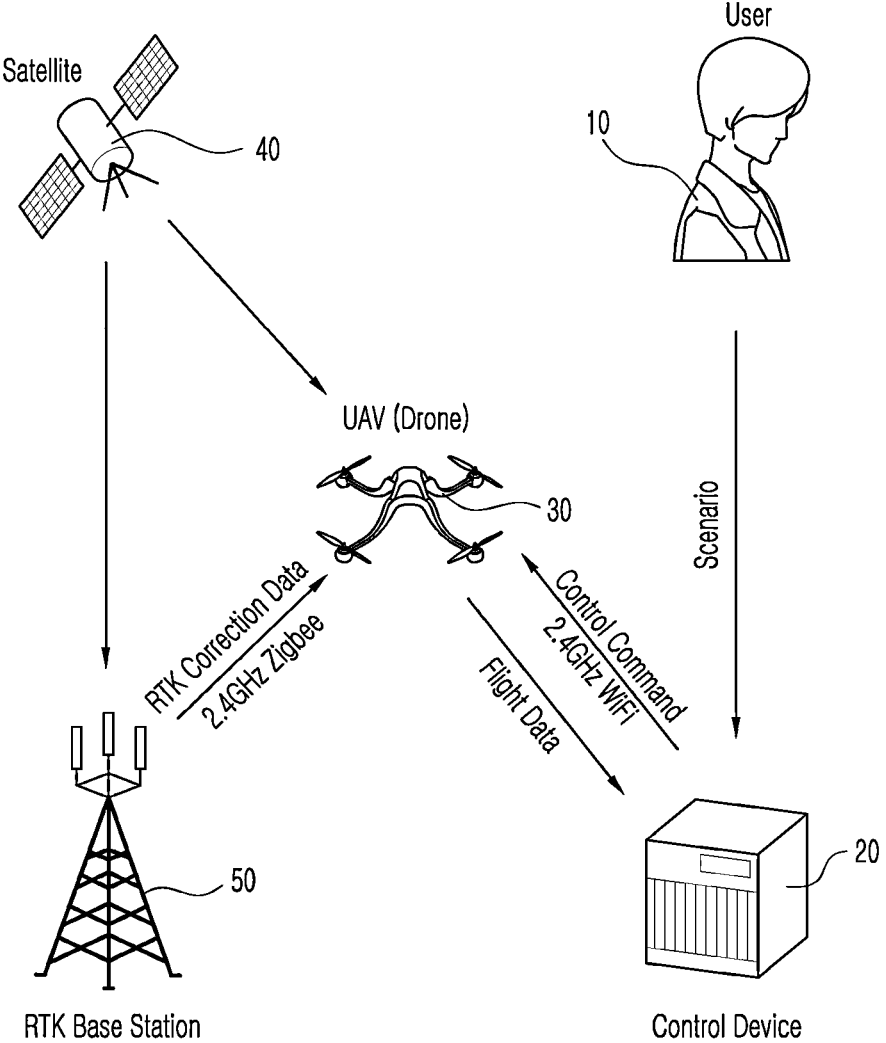
FIG. 1 illustrates a swarm system according to one embodiment of the present invention.

FIG. 1 illustrates a swarm system according to one embodiment of the present invention.

Referring to FIG. 1, the swarm system in one embodiment includes multiple unmanned aerial vehicles (UAVs) 30 and a control device 20 for controlling them. A user 10 can provide the control device 20 with a scenario for the UAVs 30 to follow during flight. The UAVs 30 may be referred to as drones. The number of UAVs 30 may range from dozens to hundreds or even thousands. In this specification, the number of vehicles 30 is represented as n.

The scenario includes information about how the UAVs 30 will move and be positioned over time. The scenario is predetermined by the user 10 and may include information on how each UAV 30 will move, fly, and position itself.

The control device 20 can control the UAVs 30 according to the scenario provided by the user 10. The control device 20 can transmit control commands to the UAVs 30 based on the provided scenario. The control commands may be delivered, for example, via a 2.5 GHz Wi-Fi signal. Alternatively, the scenario can be transmitted to the UAVs 30, and the UAVs 30 may store and fly according to the stored scenario.

The UAVs 30 can detect their location based on signals from GPS satellites 40. However, GPS-based positioning information can have errors of several meters, making it difficult to determine whether the UAVs are precisely following the scenario. Furthermore, due to GPS errors, UAVs 30 flying in a swarm are more likely to collide with each other, leading to significant problems.

To ensure accurate flight according to the scenario, it is important to precisely detect the locations of the UAVs 30.

In one embodiment, RTK-GPS (Real-Time Kinematic GPS) technology can be applied to accurately detect the positions of the UAVs 30.

The RTK base station 50 accurately knows its position on the Earth and generates RTK correction information to correct the error between the detected position and the actual position based on signals from GPS satellites 40. The RTK correction data can be provided to the UAVs 30. For example, the RTK correction data can be transmitted via a 2.4 GHz Zigbee signal. The UAVs 30 receive the RTK correction data and use it to correct the signals from the GPS satellites 40, allowing them to detect their positions with an error margin of less than a few centimeters.

The UAVs 30 detect their position and speed using the RTK correction data and provide flight data, including position and speed information, to the control device 20. The flight data may include multi-channel inertial sensor data measured and output by the inertial measurement unit (IMU) of the UAVs 30. For example, the inertial measurement unit mounted on the UAVs 30 may include devices such as a gyroscope, accelerometer, magnetometer, and barometer.

Table 1 shows the types of 16-channel inertial sensor data from the inertial measurement unit mounted on the UAVs.

TABLE 1

| Channel no. | Sensor type | Description | Unit |
|---|---|---|---|
| 1 | Gyroscope | x-direction value | rad |
| 2 | | y-direction value | rad |
| 3 | | z-direction value | rad |
| 4 | | integral_dt | Gyro measurement sampling period in microseconds (4 μs) |
| 5 | Accelerometer | timestamp_relative | μs |
| 6 | | x-direction value | m/s$^2$ |
| 7 | | y-direction value | m/s$^2$ |
| 8 | | z-direction value | m/s$^2$ |
| 9 | | integral_dt | μs |
| 10 | Magnetometer | timestamp_relative | μs |
| 11 | | x-direction value | Gauss (G) |
| 12 | | y-direction value | Gauss (G) |
| 13 | | z-direction value | Gauss (G) |
| 14 | Barometer | timestamp_relative | μs |
| 15 | | Altitude | m |
| 16 | | Temperature | ° C. |

According to the present invention, the control device 20 can detect whether each of the UAVs 30 is in an abnormal state based on the flight data received from each UAV 30. Additionally, it can detect the abnormal channel that outputs abnormal signals among the multiple channels of the inertial measurement unit of the UAV 30 detected as being in an abnormal state.

In another example, a computing device connected to the control device 20 via a network can receive flight data from each UAV 30 and detect which UAV 30 has experienced an anomaly and which channel of the inertial measurement unit is outputting abnormal signals for the anomalous UAV 30.

This specification focuses on embodiments where UAVs 30 flying in a swarm are detected for anomalies. However, the present invention is not limited to this and can also be applied to unmanned ground vehicles or swarm-moving robots that operate according to predefined scenarios. UAVs 30 can be referred to as moving vehicles, and the flight data of UAVs 30 can be referred to as movement data of the vehicles.

Figure 2:
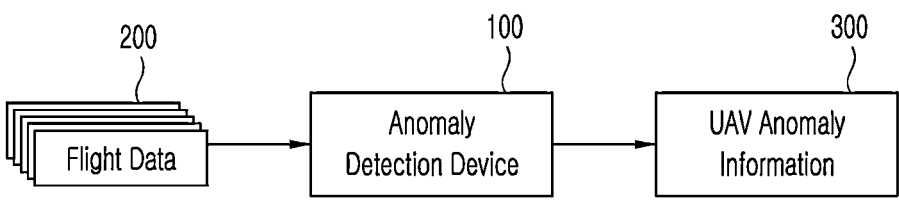
FIG. 2 schematically illustrates an anomaly detection device for a swarm system according to one embodiment of the present invention.

FIG. 2 schematically illustrates the anomaly detection device of the swarm system according to one embodiment of the present invention.

Referring to FIG. 2, the anomaly detection device 100 receives flight data 200 as input and outputs UAV anomaly information 300.

The anomaly detection device 100 may be part of the control device 20 of FIG. 1, or it may be a computing device that is communicatively connected to the control device 20 via a network. The anomaly detection device 100 can directly receive flight data 200 from the UAV 30 or receive it via the control device 20 connected through the network.

The network may include wired and/or wireless networks. For example, the network may include various networks such as a local area network (LAN), a metropolitan area network (MAN), or a wide area network (WAN). The network may also include the World Wide Web (WWW).

The network may include at least one of a known mobile communication network, known wireless data network, known telephone network, and known wired/wireless television network. The network may include one or more network topologies such as a bus network, star network, ring network, mesh network, star-bus network, tree, or hierarchical network.

As described above, in the swarm system of FIG. 1, flight data 200 generated by UAVs 30 is received, but in the case of unmanned vehicles or swarm-moving robots, movement data may be received. Flight data 200 is included within movement data.

Flight data 200 includes the flight data generated by each of the UAVs 30. For example, flight data 200 may include the first flight data of a first UAV to the nth flight data of an nth UAV.

Flight data 200 is time-series data. Flight data 200 may be time-stamped with generation time, reception time, or measurement time. For example, flight data 200 may include generation time, reception time, or measurement time.

Flight data 200 may be time-series data sampled over a preset period. For example, flight data 200 may consist of data sampled 10 times per second for a duration of 16 seconds. In this case, flight data 200 may include 160 data points for each parameter. The parameters may include kinematic variables of the UAV such as position and speed information (x-axis position, y-axis position, z-axis position, x-axis speed, y-axis speed, and z-axis speed), as well as the inertial sensor data values for the 16 channels of the inertial measurement unit, as illustrated in Table 1.

Flight data 200 may include the position information and speed information of UAV 30. UAV 30 can utilize RTK correction data received from RTK base station 50 to obtain accurate position information.

The position information of UAV 30 may include GPS coordinates and altitude information. The position information of UAV 30 may include x-axis, y-axis, and z-axis positions.

The speed information of UAV 30 may include x-axis speed, y-axis speed, and z-axis speed information. The speed information of UAV 30 may be generated based on GPS position information or using the sensor values from the inertial sensor device mounted on UAV 30.

UAV anomaly information 300 may indicate whether each UAV 30 is in a normal or abnormal state. UAV anomaly information 300 may represent the probability of each UAV 30 being in a normal or abnormal state. UAV anomaly information 300 may also identify a specific UAV among UAVs 30 that is in an abnormal state. If the probability of an abnormal state for each UAV 30 exceeds a predetermined threshold, it can be determined to be in an abnormal state, and UAV anomaly information 300 may include the identification number of the UAV determined to be abnormal.

In this specification, an abnormal state of the UAV refers to a condition where the UAV exhibits abnormal behavior. There may be various reasons for the abnormal behavior of a UAV, such as a malfunction in the UAV, communication failure with the UAV, or problems in controlling a specific UAV.

The following is a more detailed explanation of the anomaly detection device 100 that generates UAV anomaly information 300 from the flight data 200 of UAVs 30.

Figure 3:
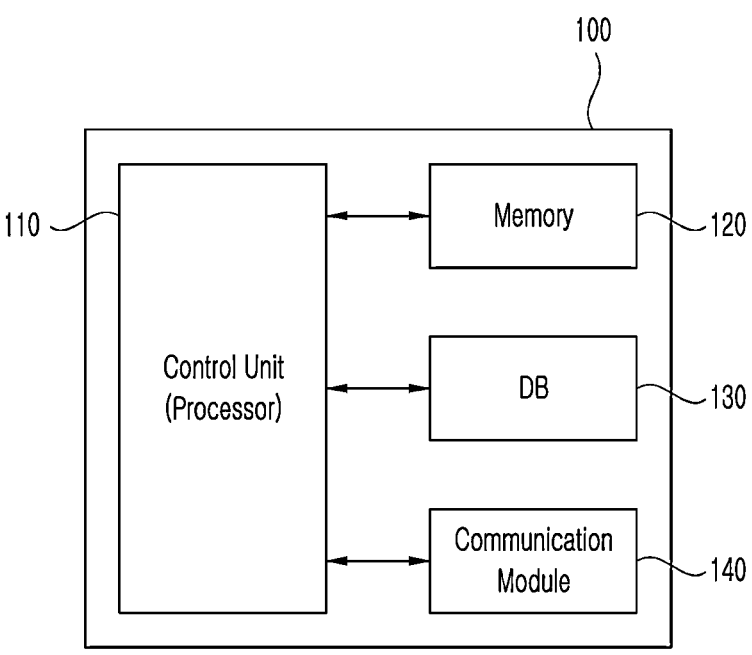
FIG. 3 schematically illustrates the internal configuration of the anomaly detection device according to one embodiment of the present invention.

FIG. 3 schematically illustrates the internal configuration of the anomaly detection device according to one embodiment of the present invention.

Referring to FIG. 3, the anomaly detection device 100 may include a control unit 110, memory 120, a database (DB) 130, and a communication module 140. The control unit 110, memory 120, DB 130, and communication module 140 can exchange data with each other through a bus.

However, not all the components shown in FIG. 3 are essential to the anomaly detection device 100. The anomaly detection device 100 may be implemented with more components than those shown in FIG. 3, or with fewer components than those shown in FIG. 3.

In one embodiment, the anomaly detection device 100 may include, in addition to the control unit 110, memory 120, DB 130, and communication module 140, input/output devices, storage devices, and other components.

The control unit 110 typically controls the overall operation of the anomaly detection device 100. The control unit 110 performs basic arithmetic, logic, and input/output operations, and can execute program code stored in the memory 120, such as an artificial intelligence neural network-based learning model. The control unit 110 may be referred to as a processor.

The memory 120 is a storage medium that can be read by the processor 110 and may include non-volatile mass storage devices such as RAM, ROM, and disk drives. The memory 120 can store an operating system and at least one program or application code. The memory 120 can also store program code for training an artificial intelligence neural network-based learning model to detect anomalies in UAVs' real-time flight data, as well as program code for generating UAV anomaly information using the trained learning model. Additionally, the memory 120 can store program code for labeling anomaly data in the training flight data using an artificial intelligence neural network-based unsupervised learning model.

The DB 130 is a storage medium that can be read by the processor 110 and may include non-volatile mass storage devices such as disk drives. The DB 130 can store the learning models and training data used to train the learning models.

The DB 130 can store flight data received from UAVs flying in a swarm. The flight data stored in the DB 130 may not necessarily be real-time data received from the UAVs but could be data collected in the past.

In this specification, past flight data can be used to train or evaluate the learning model and is referred to as training data. Real-time flight data received from the UAVs is input into the trained learning model to estimate the presence of anomalies and abnormal channels in the UAVs and is referred to as real-time flight data or input data.

The DB 130 may store flight data received from the UAVs without processing, or it may store the data in a processed form suitable for training the learning model. For example, the DB 130 may store only some of the flight data received from the UAVs, and some of the data may be modified before being stored.

The DB 130 may also store the scenario for swarm flight of the UAVs. The scenario may be created by the user 10. Additionally, the DB 130 may store the scenarios of past swarm flights of the UAVs.

The communication module 140 is a module for connecting to a network, transmitting control commands to UAVs 30, and receiving flight data from UAVs 30. In another example, the communication module 140 may receive flight data from the control device 20 and transmit the identification number of the UAV that experienced an anomaly to the control device 20. The control unit 110 can train a first learning model and multiple second learning models.

The first learning model may be trained to detect UAVs in an abnormal state among the multiple UAVs flying in a swarm.

The multiple second learning models may correspond to each of the multiple UAVs flying in a swarm. Each second learning model may be trained to detect the abnormal state of its corresponding UAV and identify the abnormal channel among the multiple channels outputting inertial sensor signals from the inertial measurement unit.

Figure 4:
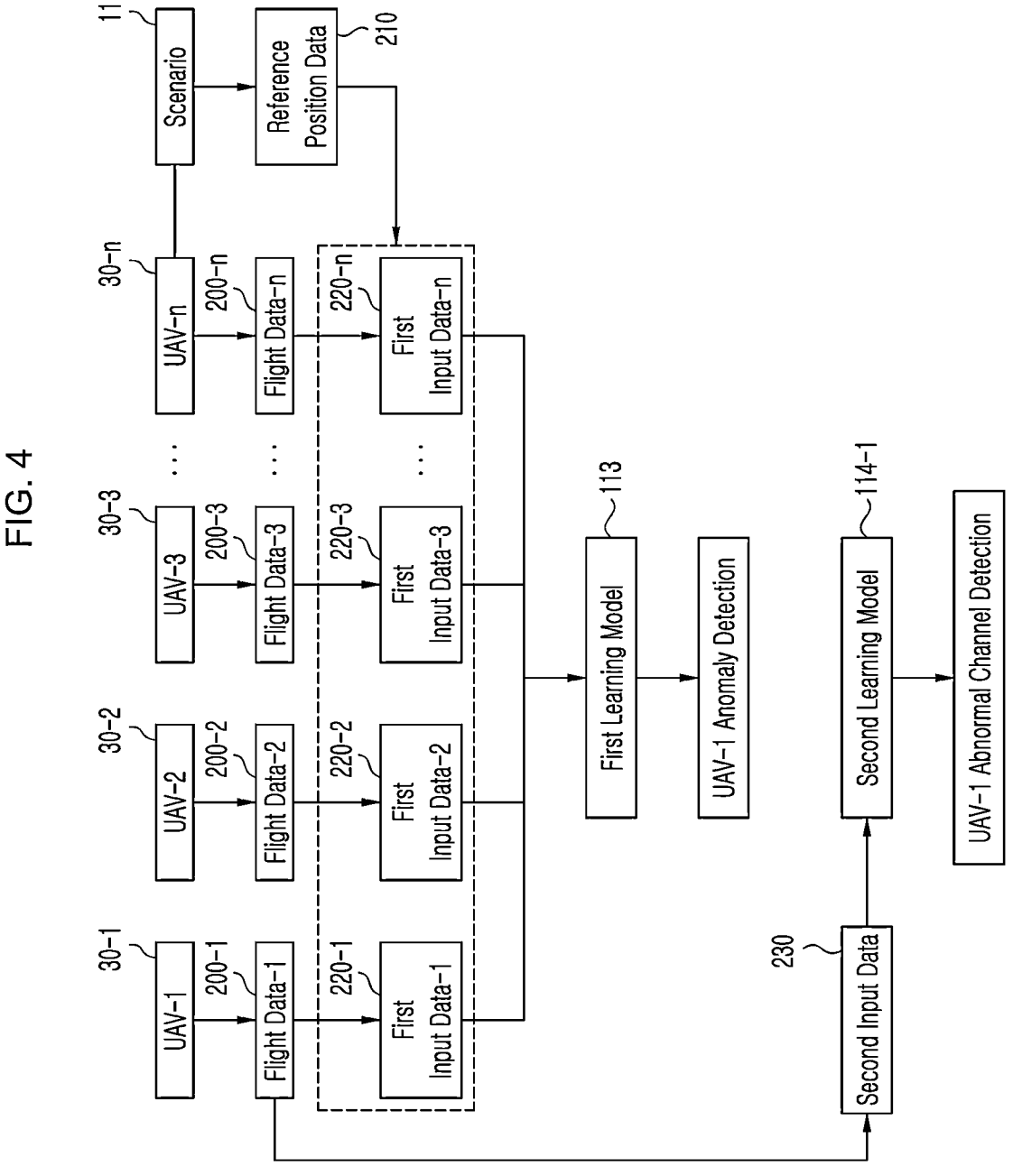
FIG. 4 is a flowchart provided to explain the anomaly detection method for a swarm system according to one embodiment of the present invention.

FIG. 4 is a diagram provided to explain the anomaly detection method of the swarm system according to one embodiment of the present invention.

Referring to FIG. 4, the anomaly detection device 100 may first receive, in real-time, n flight data sets (200-1 to 200-$n$) transmitted from n UAVs 30-1 to 30-$n$.

The UAVs 30-1 to 30-$n$ may fly in a swarm according to a predetermined scenario. Here, n may represent a large number, such as 100, but the invention is not limited to this.

The flight data 200-1 to 200-$n$ may include positioning data regarding the locations of UAVs 30-1 to 30-$n$, velocity data regarding the speeds of UAVs 30-1 to 30-$n$, and multi-channel inertial sensor data measured by the inertial measurement units mounted on UAVs 30-1 to 30-$n$.

The anomaly detection device 100 may generate n first input data sets 220-1 to 220-$n$ corresponding to each of the n UAVs 30-1 to 30-$n$ based on the positioning data included in the n flight data sets 200-1 to 200-$n$.

For example, the anomaly detection device 100 may generate reference position data 210, which includes the reference positions where each of the UAVs 30-1 to 30-$n$ should be located according to a predefined scenario. The anomaly detection device 100 may then generate deviation data corresponding to the difference between the positioning data included in the n flight data sets 200-1 to 200-$n$ and the reference position data 210, and may further generate normalized data based on the deviation data.

The n first input data sets 220-1 to 220-$n$ may include the deviation data corresponding to the difference between the positioning data of the n UAVs 30-1 to 30-$n$ and the reference positions, or normalized data based on the deviation data. In some embodiments, the n first input data sets 220-1 to 220-$n$ may also include normalized velocity data from the flight data 200-1 to 200-$n$.

The anomaly detection device 100 may input the n first input data sets 220-1 to 220-$n$ into the first learning model 113 to detect, in real-time, an abnormal UAV among the n UAVs 30-1 to 30-$n$ that is estimated to be in an abnormal state.

Next, the anomaly detection device 100 may generate second input data 230 corresponding to the UAV 30-2 detected as abnormal by the first learning model 113 (for convenience of explanation, FIG. 4 illustrates the first UAV 30-1 as being detected as abnormal). Here, the second input data 230 may be generated by pre-processing the multi-channel inertial sensor data included in the flight data 220-1 of the first UAV 30-1 using a predefined method. For example, min-max normalization or standardization may be applied to the multi-channel inertial sensor data included in the flight data 220-2.

The anomaly detection device 100 may input the second input data 230 into the second learning model 114-1 corresponding to the first UAV 30-1. The second learning model 114-1, upon receiving the second input data 230, may detect whether the first UAV 30-1 is abnormal and which of the multiple channels of the inertial measurement unit mounted on the first UAV 30-1 is an abnormal channel.

Figure 5:
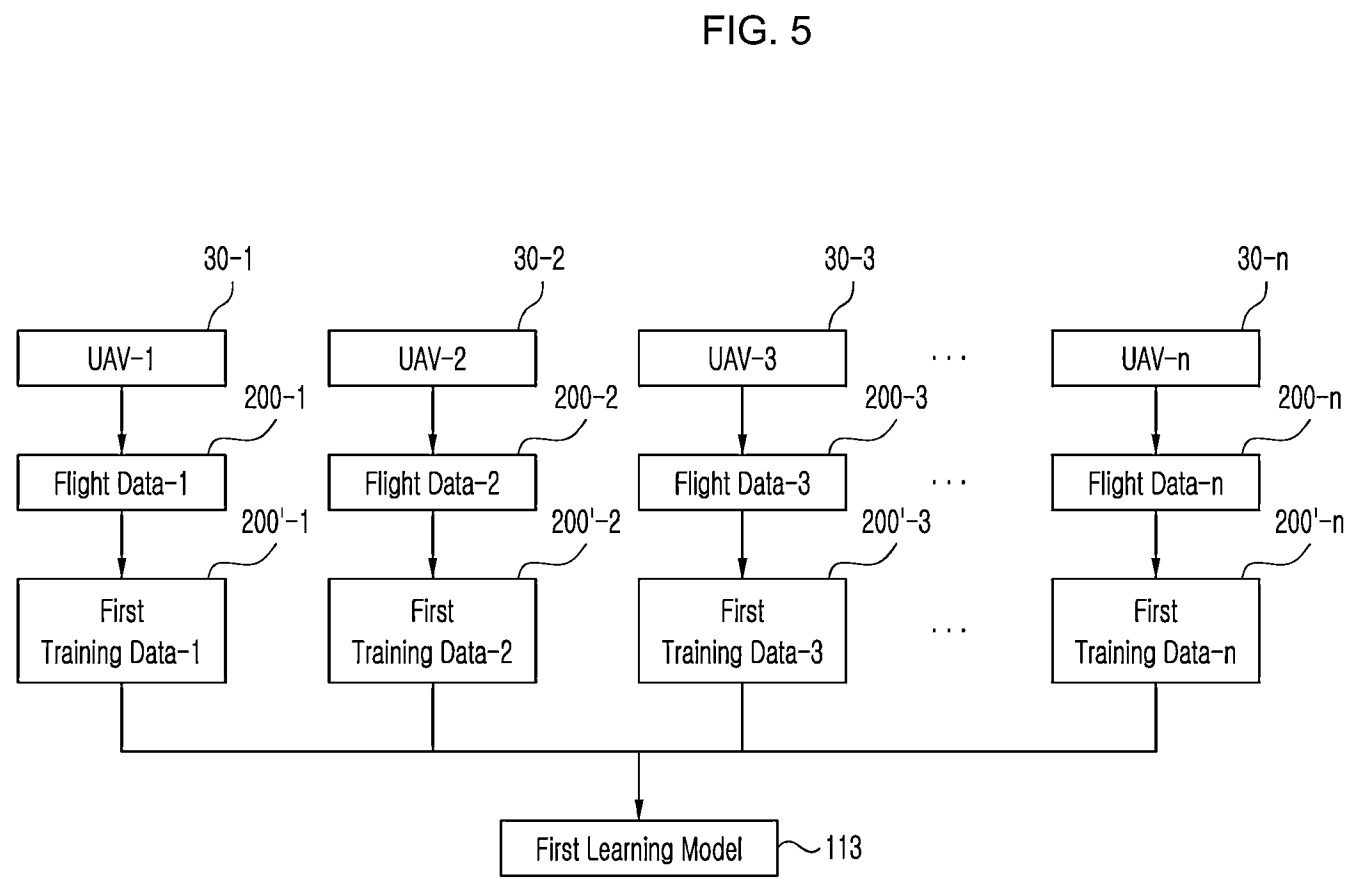

FIG. 5 is a diagram provided to explain the method for training the first learning model according to one embodiment of the present invention.

Referring to FIG. 5, the anomaly detection device 100 may first collect n flight data sets 200-1 to 200-$n$ from n UAVs 30-1 to 30-$n$ flying in a swarm according to a scenario and store them in the DB (130 in FIG. 2). Here, n may represent a large number, such as 100, but the invention is not limited to this. The flight data 200-1 to 200-$n$ may include positioning data regarding the locations of UAVs 30-1 to 30-$n$, velocity data regarding the speeds of UAVs 30-1 to 30-$n$, and multi-channel inertial sensor data output from the inertial measurement units (not shown) mounted on UAVs 30-1 to 30-$n$.

The flight data 200-1 to 200-$n$ may be collected through a single swarm flight, but it is also possible to collect more flight data 200-1 to 200-$n$ through multiple swarm flights. Multiple swarm flights may be performed based on the same scenario or different scenarios for each swarm flight.

The anomaly detection device 100 may generate n first training data sets 220'-1 to 220'-$n$ corresponding to each of the UAVs 30-1 to 30-$n$ based on the positioning data included in the flight data 200-1 to 200-$n$.

The anomaly detection device 100 may generate reference position data corresponding to where each UAV 30-1 to 30-$n$ should be located according to the scenario and generate deviation data corresponding to the difference between the positioning data included in the flight data 200-1 to 200-$n$ and the reference position data. The anomaly detection device 100 may normalize the deviation data, and the normalized deviation data may be included in the first training data sets 220'-1 to 220'-$n$. In some embodiments, the anomaly detection device 100 may also include normalized velocity data from the flight data 200-1 to 200-$n$.

The anomaly detection device 100 may train the first learning model 113 to detect abnormal UAVs among the swarm-flying UAVs 30-1 to 30-$n$ based on the first training data sets 220'-1 to 220'-$n$.

If the first learning model 113 is a supervised learning model, the anomaly detection device 100 may train the first learning model 113 using labeled data with anomaly information from the first training data 220'-1 to 220'-$n$.

The supervised learning model 113 may be built considering the application field of the recognition model, the purpose of the learning, or the computational performance of the device. For example, the supervised learning model 113 may be a neural network-based learning model, such as DNN (Deep Neural Network), RNN (Recurrent Neural Network), or BRDNN (Bidirectional Recurrent Deep Neural Network), but it is not limited to these.

The anomaly information labeled in the first training data sets 220'-1 to 220'-$n$ refers to whether the first training data sets 220'-1 to 220'-$n$ represent a normal state or an abnormal state, indicating whether the corresponding UAVs 30-1 to 30-$n$ are exhibiting abnormal behavior.

The anomaly detection device 100 may label the first training data sets 220'-1 to 220'-$n$ with anomaly information determined based on an unsupervised learning model.

For example, the first training data sets 220'-1 to 220'-$n$ may be classified using unsupervised learning models such as k-means clustering or principal component analysis (PCA), and the anomaly status of the first training data sets 220'-1 to 220'-$n$ may be determined based on the ratio of their classification results. Alternatively, an engineer may manually determine the anomaly status of the first training data sets 220'-1 to 220'-$n$ based on the ratio of their classification results.

The anomaly detection device 100 may train the supervised learning model 113 using a learning algorithm such as error back-propagation or gradient descent.

Figure 6:
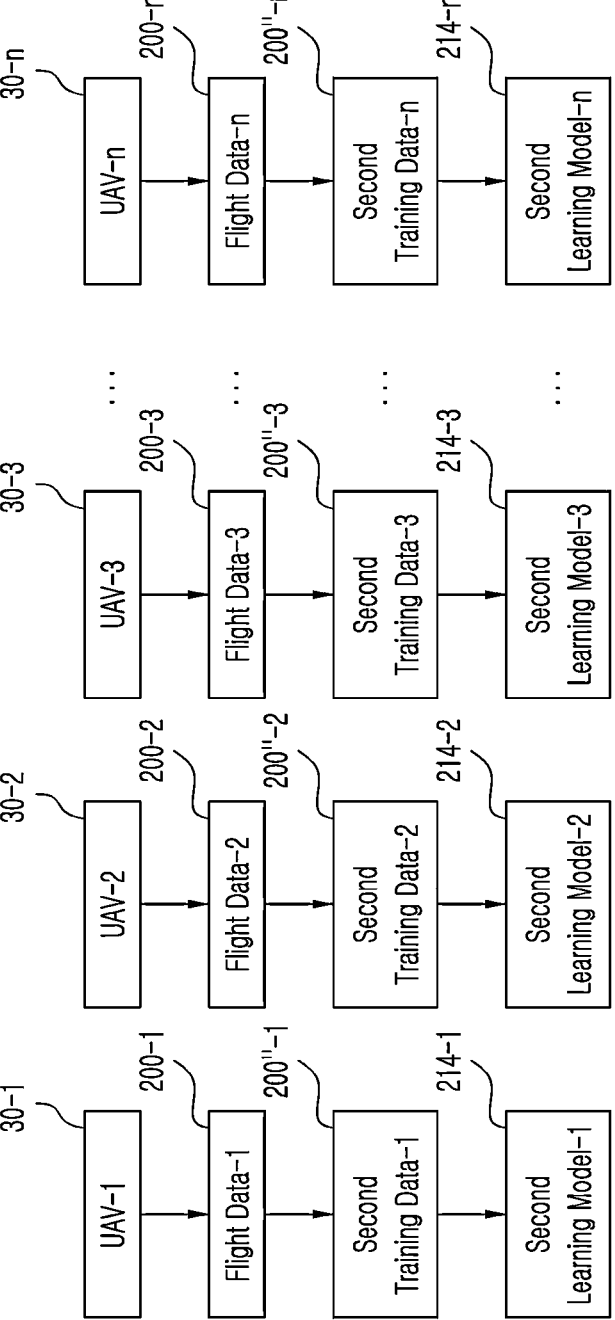
FIG. 6 is a diagram illustrating the method for training the second learning model according to one embodiment of the present invention.

FIG. 6 is a diagram provided to explain the method for training the second learning model according to one embodiment of the present invention.

Referring to FIG. 6, the anomaly detection device 100 may first generate n second training data sets 220"-1 to 220"-$n$ corresponding to each of the UAVs 30-1 to 30-$n$ based on the multi-channel inertial sensor data included in the flight data 200-1 to 200-$n$.

The anomaly detection device 100 may apply normalization processing, such as min-max normalization or standardization, to the multi-channel inertial sensor data included in the flight data 200-1 to 200-$n$, and preprocess the data in a form suitable for training the second learning models 114-1 to 114-$n$, generating the second training data sets 220"-1 to 220"-$n$.

The second training data sets 220"-1 to 220"-$n$ may be classified as normal or abnormal through k-means clustering, principal component analysis (PCA), or similar methods, and only part of the data classified as normal may be labeled as normal.

Unlike the first learning model 113, the second learning models 114-1 to 114-$n$ are individually trained with the second training data sets 220"-1 to 220"-$n$ corresponding to each UAV.

According to the labeling status of the second training data 220"-1 to 220"-$n$, the second learning models 114-1 to 114-$n$ may be trained using supervised, semi-supervised, or unsupervised learning techniques.

For example, if normal and abnormal labeling data are prepared in a balanced manner, a supervised learning technique may be applied to train the second learning models 114-1 to 114-$n$. If there is an abundance of normal data compared to abnormal data or a shortage of abnormal data, a semi-supervised learning technique may be used to train the second learning models 114-1 to 114-$n$. In this case, the second learning models 114-1 to 114-$n$ may be implemented as generative models such as Variational Autoencoder (VAE), AnoGAN, GANomaly, or Skip-GANomaly, and may be trained using the second training data 220"-1 to 220"-$n$ with the semi-supervised learning technique. If neither normal nor abnormal data are labeled, the second learning models 114-1 to 114-$n$ may be trained using an unsupervised learning technique.

FIGS. 7A to 7D illustrate the architecture of the second learning model according to the present invention.

Figure 7A:
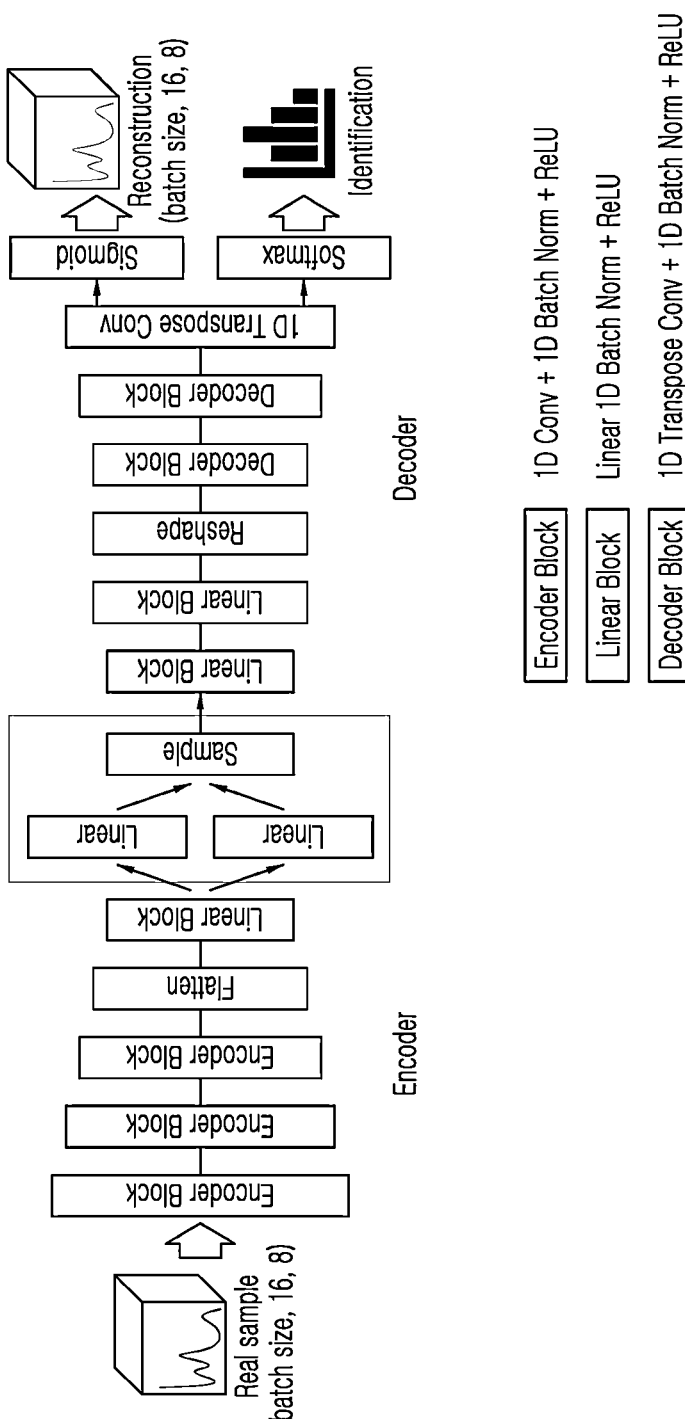
FIGS. 7A to 7D illustrate the architecture of the second learning model according to the present invention.
Figure 7B:
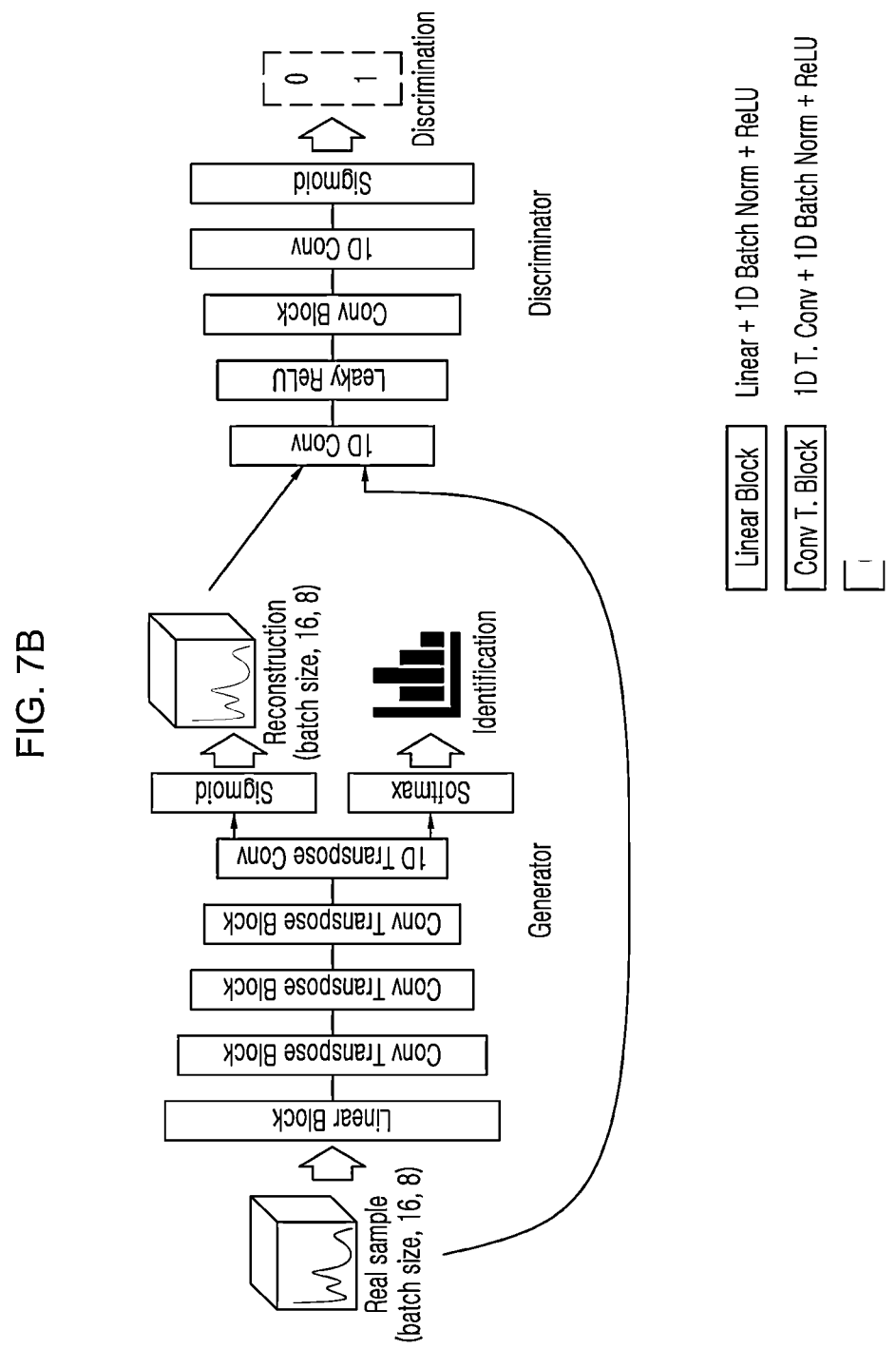
Figure 7C:
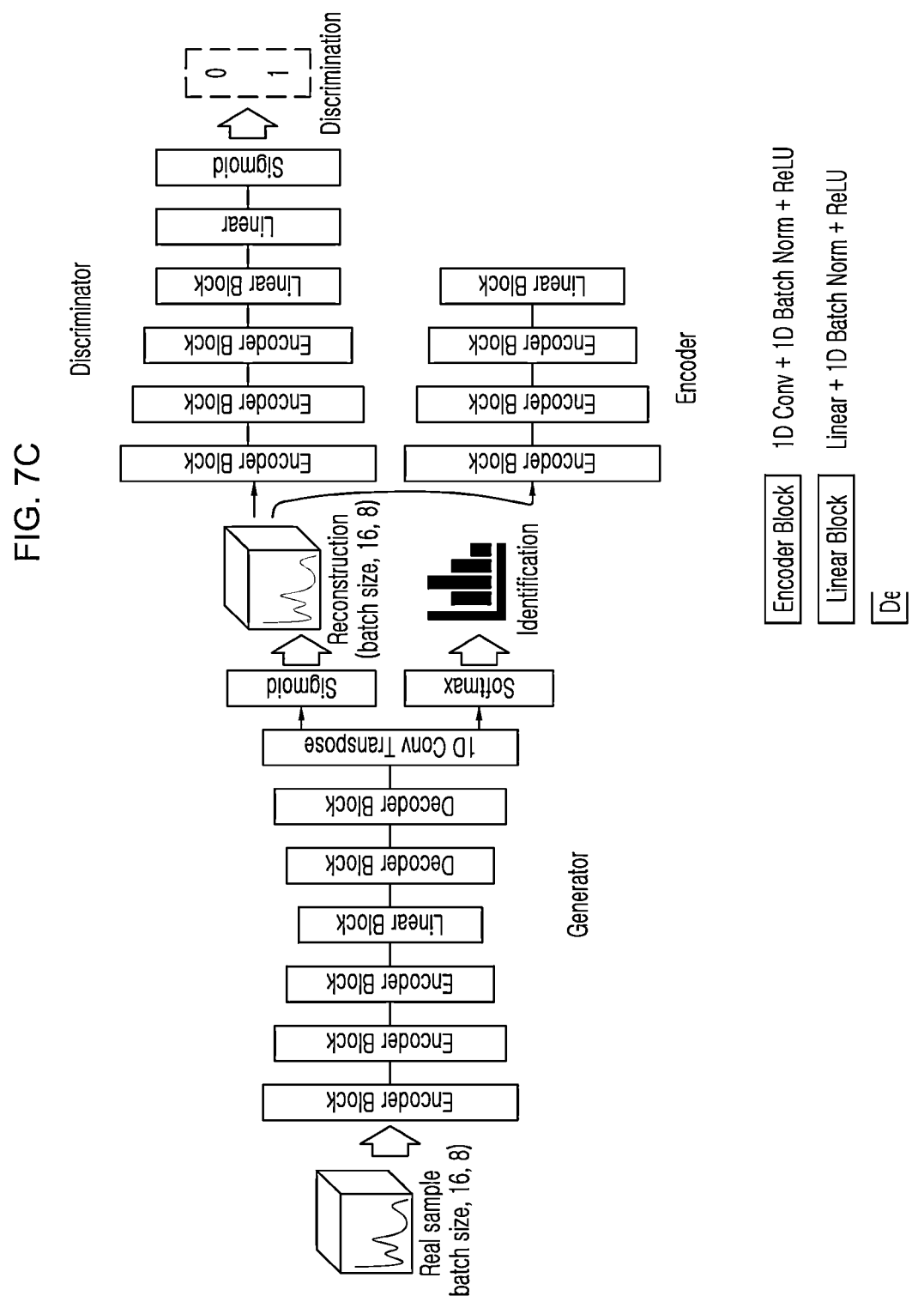
Figure 7D:
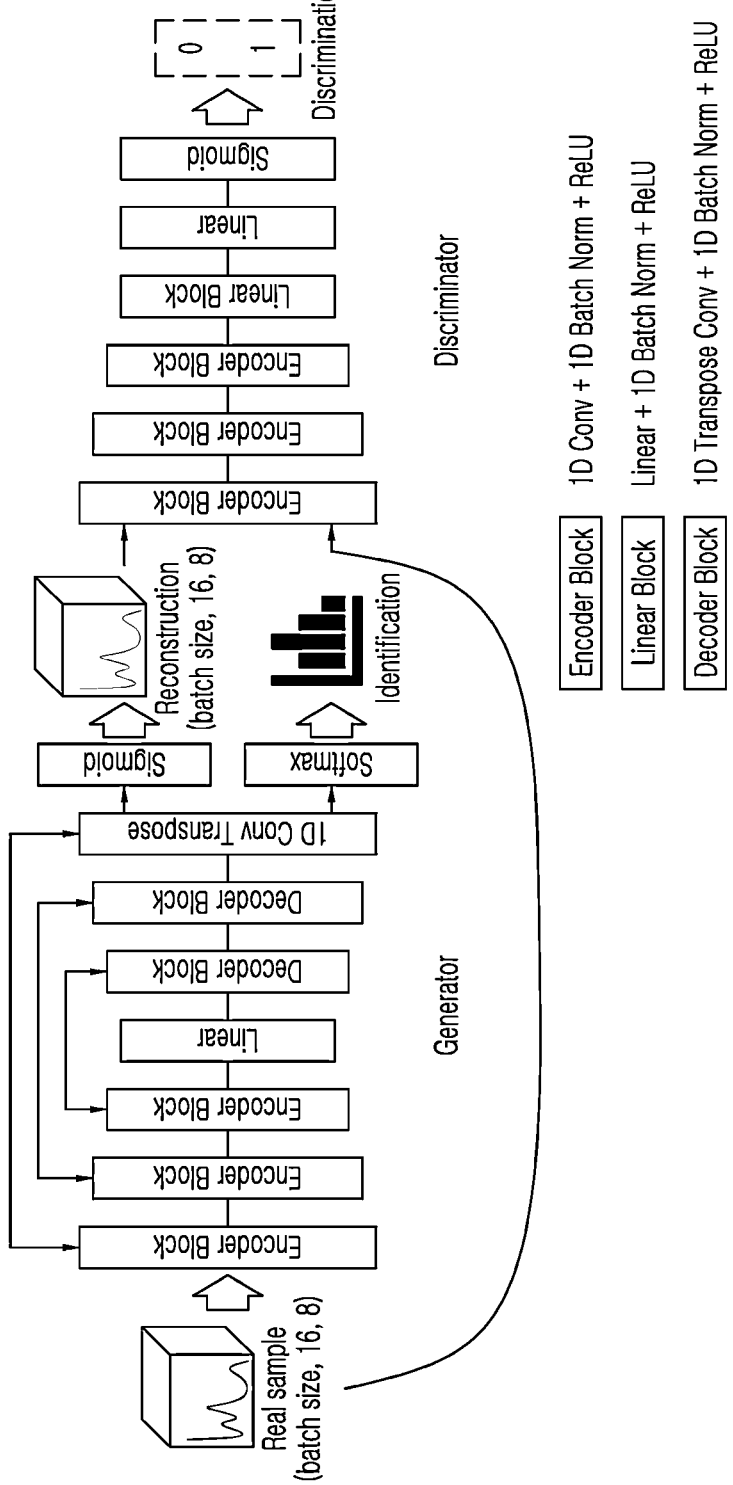

For example, in FIG. 7A, the decoder, and in FIGS. 7B to 7D, the generator, can be trained to generate reconstructed data from the input data and output it.

To this end, the second learning models 114-1 to 114-$n$ can first be trained to generate reconstructed data from the input data using the data labeled as normal from the second training data sets 220"-1 to 220"-$n$ and to determine whether the input data is normal based on this reconstruction. The remaining unlabeled data in the second training data sets 220″-1 to 220″-*n* can then be used to evaluate the performance of the second learning models 114-1 to 114-*n*, and the hyperparameters of the second learning models 114-1 to 114-*n* can be adjusted in this process.

Well-known performance evaluation metrics such as Accuracy, Precision, Recall, F1-score, and ROC (receiver operating characteristic) curves can be used to assess the performance of the models.

The second learning models 114-1 to 114-*n* can be trained to calculate the reconstruction error by comparing the input data with the reconstructed data, and to detect the UAVs corresponding to the second learning models 30-1 to 30-*n* as abnormal if the reconstruction error is greater than or equal to a predetermined threshold.

If the reconstruction error exceeds the predefined threshold, the corresponding UAVs 30-1 to 30-*n* can be detected as abnormal. Here, the threshold may be set based on the value that best predicted the anomaly during the training phase of the second learning models 114-1 to 114-*n*.

If the corresponding UAVs 30-1 to 30-*n* are detected as abnormal, the second learning models 114-1 to 114-*n* may be configured to detect the abnormal channel based on the abnormal probability values calculated for each channel of the inertial measurement unit.

Referring to FIG. 7A, in the case of the VAE model, after the final hidden layer of the decoder, the output layer can be divided into a sigmoid layer and a softmax layer. The sigmoid layer can be configured to output feature-specific reconstructed data of the input data, and the softmax layer can be configured to output feature-specific abnormal probability values.

Referring to FIGS. 7B to 7D, in the case of AnoGAN, GANomaly, and Skip-GANomaly models, after the final hidden layer of the generator, the output layer can be divided into a sigmoid layer and a softmax layer. The sigmoid layer can be configured to output feature-specific reconstructed data of the input data, and the softmax layer can be configured to output feature-specific abnormal probability values.

After training the second learning models 114-1 to 114-*n*, the output layer after the final hidden layer of the second learning models 114-1 to 114-*n* can be divided into a sigmoid layer and a softmax layer. The sigmoid layer outputs feature-specific reconstructed data of the input data, while the softmax layer outputs feature-specific abnormal probability values. Here, the features may correspond to each channel of the inertial measurement unit, and the sum of the feature-specific abnormal probability values output by the softmax layer equals 1.

The sigmoid layer can be obtained using the sigmoid activation function as shown in Equation 1 below, and can output the feature-specific (i.e., each channel of the inertial measurement unit) reconstructed data of the actual input data. The reconstruction error can be calculated using Equation 2.

$$s(x_i) = \frac{1}{1+e^{-x_i}} \qquad \text{[Equation 1]}$$

In this case, $x_i$ represents the actual data sample, and i (i=1, 2, . . . , N) represents the number (index) of the input channels.

12

$$\varepsilon = \frac{\sum_{i=1}^{B} |x_i - \hat{x}_i|}{B \times N} \qquad \text{[Equation 2]}$$

where $x_i$ represents the actual data sample of the i-th input channel, $\hat{x}_i$ is the predicted (reconstructed) value of the i-th input channel, i (i=1, 2, . . . , N) is the number (index) of the input channels, B is the batch size, and N is the total number of data input channels.

The softmax layer can output feature-specific abnormal probability values using the softmax function as shown in Equation 3 below. In the softmax function, the sum of the abnormal probability values output for each feature equals 1.

$$\sigma(x_i) = \frac{e^{x_i}}{\sum_{j=1}^{N} e^{x_j}} \qquad \text{[Equation 3]}$$

Here, $x_i$ represents the actual data sample of the i-th input channel, i (i=1, 2, . . . , N) is the number (index) of the input channel, and N is the total number of data input channels.

The sigmoid layer, softmax layer, and each activation function described above are merely examples, and it is possible to adopt other models or functions that receive actual inertial sensor data samples output from each channel of the inertial measurement unit mounted on UAVs 30-1 to 30-*n*, generate reconstructed data, compare the generated reconstructed data with the input data samples, and determine that the corresponding UAV is abnormal if the reconstruction error exceeds a predefined threshold. At that time, the model may calculate abnormal probability values for multiple input channels and identify the channel with the highest abnormal probability as the abnormal channel.

Figure 8:
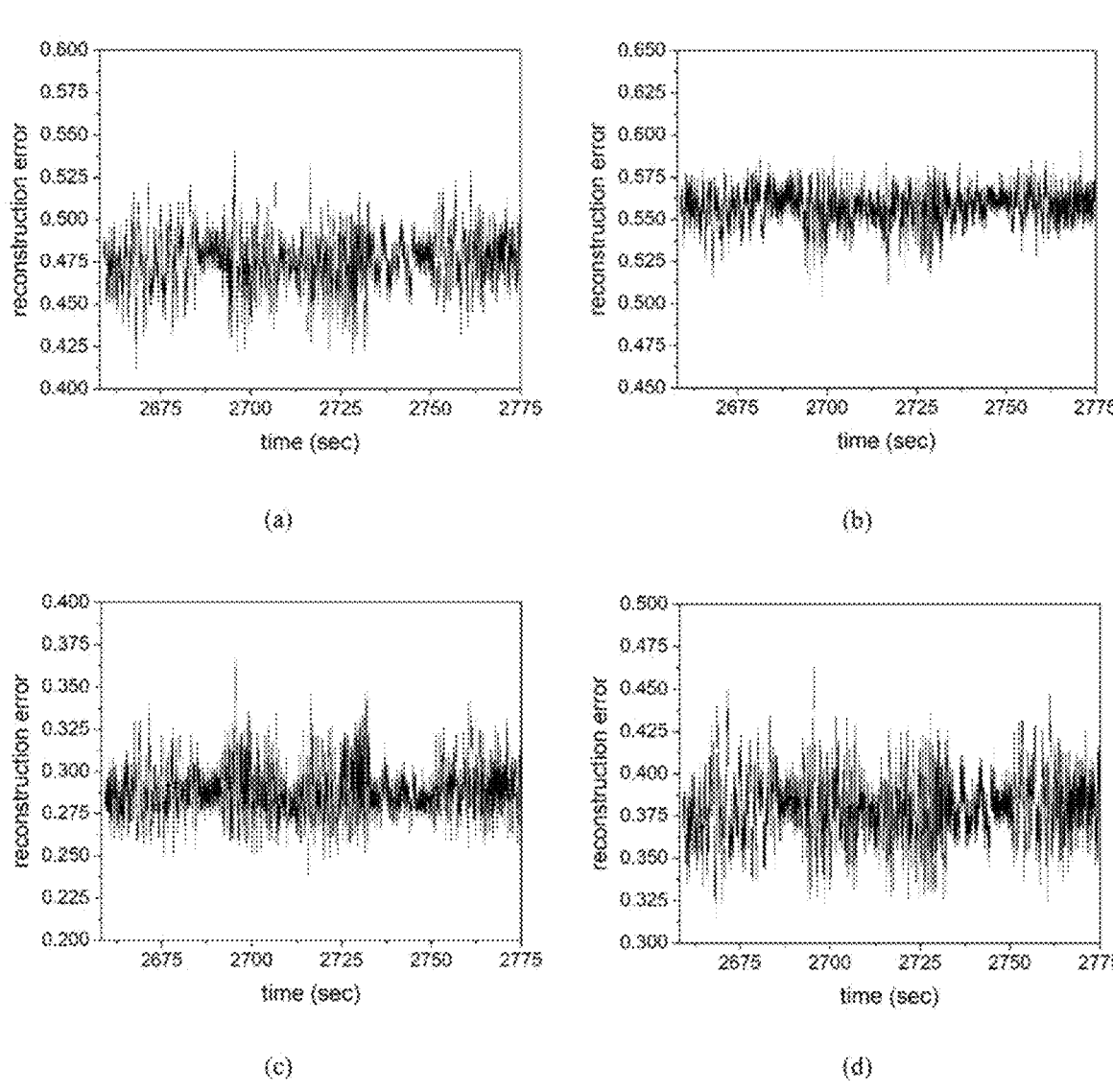
FIGS. 8 to 10 show examples of classifying abnormal cases based on reconstruction errors according to the present invention.
Figure 9:
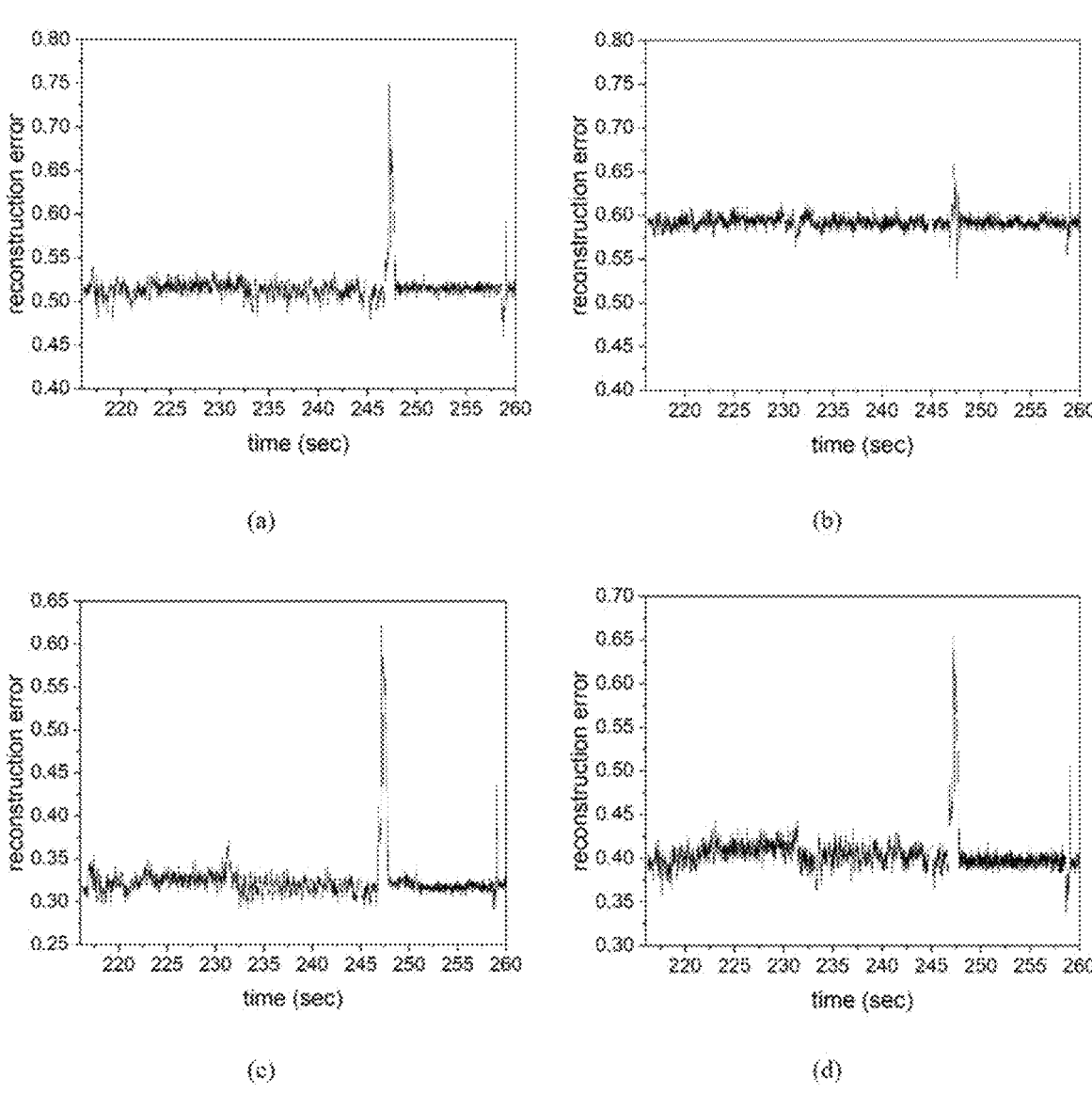
Figure 10:
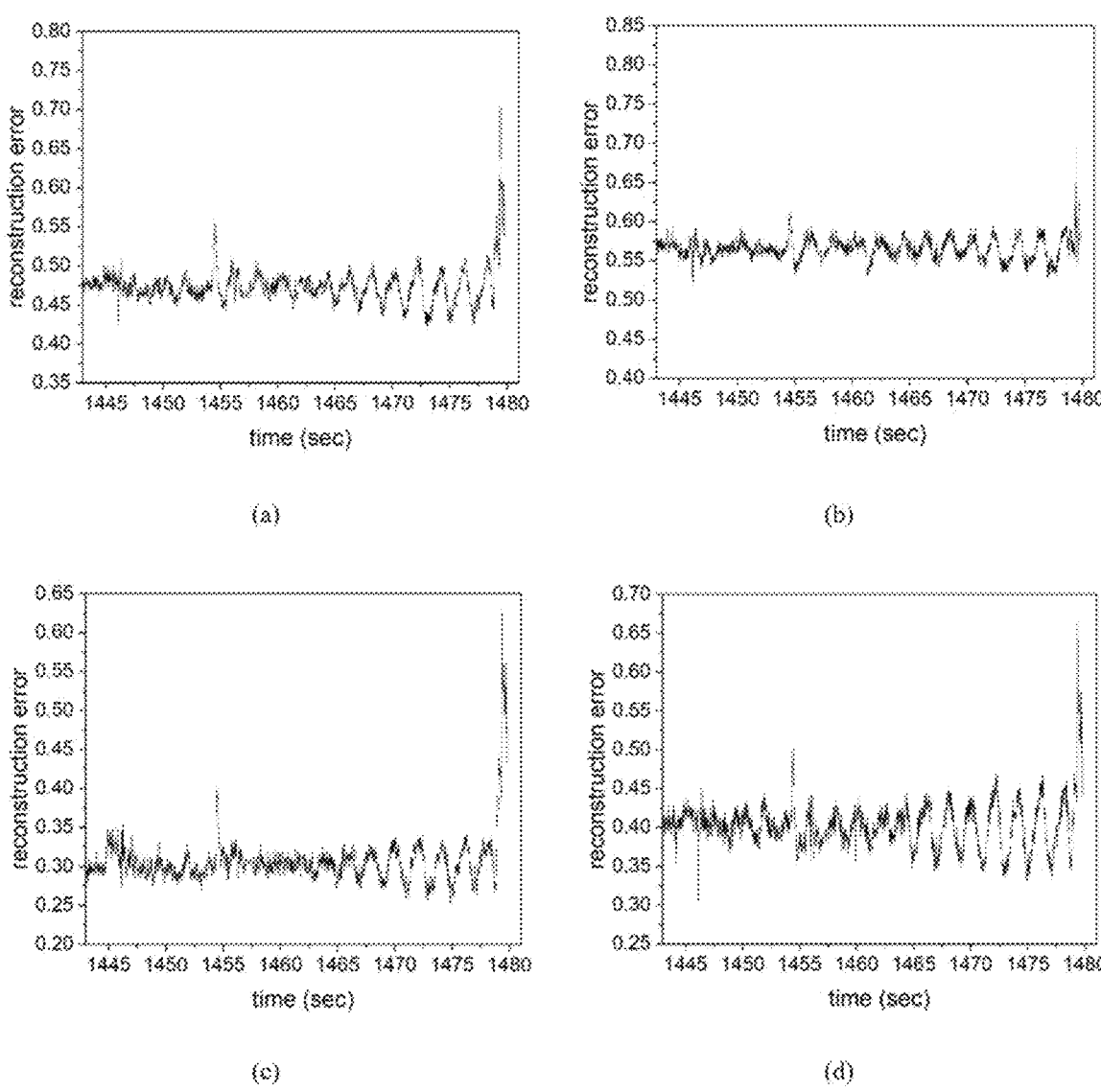

FIGS. 8 to 10 illustrate examples of cases classified based on reconstruction errors obtained according to the present invention.

In FIGS. 8 to 10, (a) represents the case where the second learning model is implemented using VAE, (b) represents the case using AnoGAN, (c) represents the case using GANomaly, and (d) represents the case using Skip-GANomaly.

In FIG. 8, the case shows small fluctuations where the reconstruction error does not exceed 0.1, and this can be classified as representing the normal state of the vehicle.

In FIG. 9, there is a section where the reconstruction error spikes but later returns to the normal state. Such reconstruction errors were found to be caused by temporary communication errors or issues with the control logic.

In FIG. 10, the reconstruction error spikes and then the UAV fails to operate, which corresponds to a case where the drone crashes due to a severe malfunction.

FIG. 11 is a graph showing the average reconstruction error for each channel of the UAV in which an abnormal state was detected during a test flight, and FIG. 12 is a graph showing the position data confirmed through flight log analysis in the case of FIG. 11.

Referring to FIG. 11, it can be confirmed that there is an abnormality in channel 11 among the 16 channels of inertial sensor data. Channel 11 corresponds to the X-axis value of the magnetometer, and it can be determined that the cause of the UAV's abnormality was due to an error in the magnetometer.

Referring to FIG. 12, through flight log analysis, it was confirmed that although the drone successfully compensated for the error through the flight control logic, the malfunction occurred due to the magnetometer error. As shown in case (a) of FIG. 12, it was observed that the yaw value error occurred from the beginning of the flight and was continuously adjusted by the control logic. However, at a certain point, this error became uncontrollable.

The embodiments described above may be implemented as a hardware component, a software component, and/or a combination of a hardware component and a software component. For example, the devices, methods, and components described in the embodiments may be implemented by using one or more general computing device or specific-purpose computing device such as a processor, a controller, an arithmetic logic unit (ALU), a digital signal processor, a microcomputer, a field programmable gate array (FPGA), a programmable logic unit (PLU), a microprocessor, or any other device capable of executing instructions and responding thereto. The processing device may execute an operating system (OS) and one or more software applications executed on the operating system. Further, the processing device may access, store, operate, process, and generate data in response to the execution of software. For convenience of understanding, it is described in certain examples that one processing device is used, but one of ordinary skill in the art may understand that the processing device may include a plurality of processing elements and/or a plurality of types of processing elements. For example, the processing device may include a plurality of processors or one processor and one controller. In addition, other processing configurations such as a parallel processor are possible.

The software may include a computer program, code, instructions, or a combination of one or more of the above, and may configure the processing unit, or instruct the processing unit independently or collectively to operate as desired. Software and/or data may be interpreted by the processing device or, in order to provide instructions or data to the processing device, may be embodied in any type of machine, component, physical device, virtual equipment, computer storage medium or device, or signal wave transmission, permanently or temporarily. The software may be distributed over networked computer systems and stored or executed in a distributed manner. The software and data may be stored on one or more computer-readable recording media.

The method according to the embodiment may be implemented in the form of program instructions that can be executed through various computer means and recorded in a computer-readable medium. The computer readable medium may include program instructions, data files, data structures, and the like alone or in combination. The program instructions recorded on the medium may be those specially designed and configured for the purposes of the embodiments, or may be known and available to those skilled in computer software. Examples of computer readable recording medium include magnetic media such as hard disks, floppy disks, and magnetic tape, optical media such as CD-ROMs and DVDs, magneto-optical media such as floptical disks, and hardware devices specifically configured to store and execute program instructions such as ROM, RAM, flash memory, and the like. Examples of the program instructions include machine language codes such as those generated by a compiler, as well as high-level language codes that may be executed by a computer using an interpreter, and so on. The hardware device described above may be configured to operate as one or more software modules in order to perform the operations according to the embodiments, and vice versa.

As described above, although the embodiments have been described with reference to the limited drawings, a person of ordinary skill in the art can apply various technical modifications and variations based on the above. For example, even when the described techniques are performed in the order different from the method described above, and/or even when the components of the system, structure, device, circuit, and the like are coupled or combined in a form different from the way described above, or replaced or substituted by other components or equivalents, an appropriate result can be achieved.

The invention claimed is:

1. A method for detecting anomalies in a swarm system, wherein the method is implemented on a computing device comprising a processor, and a memory storing instructions or programs executable by the processor, and comprises:

collecting a plurality of first movement data from multiple vehicles that moved as a swarm according to a first scenario, wherein the plurality of first movement data includes positioning data and multi-channel inertial sensor data;

generating a plurality of first training data corresponding to each of the vehicles based on the positioning data included in the plurality of first movement data, and training a first learning model using the plurality of first training data;

generating a plurality of second training data corresponding to each of the vehicles based on the multi-channel inertial sensor data included in the plurality of first movement data, and training a plurality of second learning models corresponding to each of the vehicles using the second training data generated for each of the vehicles;

receiving in real time a plurality of second movement data from the vehicles moving as a swarm according to a second scenario, wherein the plurality of second movement data includes positioning data and multi-channel inertial sensor data;

generating a plurality of first input data corresponding to each of the vehicles based on the positioning data included in the plurality of second movement data, and inputting the plurality of first input data into the first learning model to detect in real time any abnormal vehicle estimated to be in an abnormal state among the vehicles; and generating a second input data corresponding to the abnormal vehicle based on the multi-channel inertial sensor data included in the second movement data corresponding to the abnormal vehicle, and inputting the second input data into the second learning model corresponding to the abnormal vehicle to identify the abnormal channel among the multiple channels of the inertial measurement unit of the abnormal vehicle.

2. The method according to claim 1, wherein the second learning models are trained using a supervised learning technique, a semi-supervised learning technique, or an unsupervised learning technique with the second training data based on a labeling status of the second training data.

3. The method according to claim 2, wherein only a portion of the second training data is labeled as being in a normal state, and the second learning models are trained using a semi-supervised learning technique with the second training data.

4. The method according to claim 3, wherein the second learning models are Generative models.

5. The method according to claim 4, wherein the second learning models are any one of a VAE (Variational Autoencoder), AnoGAN, GANomaly, or Skip-GANomaly.

6. The method according to claim 4, wherein the second learning models generate multi-channel reconstructed data for each of the multi-channel inertial sensor data included in the second input data, identify the abnormal state of the abnormal vehicle based on reconstruction errors between each of the multi-channel inertial sensor data and each of the multi-channel reconstructed data, and identify the abnormal channel based on anomaly probability values calculated for each of the multiple channels.

7. A method for detecting anomalies in a swarm system, wherein the method is implemented on a computing device comprising a processor, and a memory storing instructions or programs executable by the processor, and comprises:

collecting a plurality of first movement data from multiple vehicles that moved as a swarm according to a first scenario, wherein the plurality of first movement data includes multi-channel inertial sensor data;

generating a plurality of training data corresponding to each of the vehicles based on the plurality of first movement data, and training a plurality of learning models corresponding to each of the vehicles using the training data generated for each vehicle;

collecting in real time a plurality of second movement data from the vehicles moving as a swarm according to a second scenario, wherein the plurality of second movement data includes multi-channel inertial sensor data;

generating a plurality of input data corresponding to each of the vehicles based on the plurality of second movement data, and inputting the plurality of input data into the corresponding learning models to detect anomalies in each of the vehicles; and identifying the abnormal channel among the multiple channels of the inertial measurement unit of the vehicle detected to be in an abnormal state.

8. The method according to claim 7, wherein the learning models are trained using a supervised learning technique, a semi-supervised learning technique, or an unsupervised learning technique with the training data based on a labeling status of the training data.

9. The method according to claim 8, wherein only a portion of the training data is labeled as being in a normal state, and the learning models are trained using a semi-supervised learning technique with the training data.

10. The method according to claim 9, wherein the learning models are Generative models.

11. The method according to claim 10, wherein the learning models are any one of a VAE (Variational Autoencoder), AnoGAN, GANomaly, or Skip-GANomaly.

12. The method according to claim 10, wherein the learning models generate reconstructed data for each of the multi-channel inertial sensor data included in the second movement data, identify the abnormal state of the abnormal vehicle based on the reconstruction errors between the inertial sensor data and the reconstructed data for each channel, and identify the abnormal channel based on the anomaly probability values calculated for each channel.

13. A non-transitory computer-readable recording medium storing a program for executing the method of claim 1 on a computer.

* * * * *